United States Patent

Capone

[11] 3,907,036
[45] Sept. 23, 1975

[54] RACING TYPE HORSESHOE

[76] Inventor: Angelo W. Capone, 3146 Draper St., Philadelphia, Pa. 19136

[22] Filed: Mar. 21, 1974

[21] Appl. No.: 453,430

[52] U.S. Cl. .................. 168/26; 168/28
[51] Int. Cl.² ........................... A01L 7/02
[58] Field of Search .......... 168/26, 28, 12–16, 168/23

[56] References Cited
UNITED STATES PATENTS

| | | | |
|---|---|---|---|
| 55,215 | 5/1866 | Ince | 168/23 |
| 957,707 | 5/1910 | Orosz | 168/26 X |
| 1,169,324 | 1/1916 | Dunning | 168/28 |
| 1,478,874 | 12/1923 | Law | 168/28 |
| 2,191,834 | 2/1940 | Slack | 168/28 |
| 3,302,723 | 2/1967 | Renkenberger et al. | 168/4 |
| 3,630,289 | 2/1971 | Norberg | 168/28 |

*Primary Examiner*—Hugh R. Chamblee
*Attorney, Agent, or Firm*—Weiser, Stapler & Spivak

[57] ABSTRACT

A racing type horse shoe including a plastic sole plate within which is embedded an aluminum horse shoe. The sole plate covers substantially the entire hoof and it is provided with a V-shaped notch to accommodate the frog. The sole plate is molded to provide a flexible plastic pad which includes a triangular frog pad. The flexible pad includes an angular, peripheral flange which provides a seat for the metallic horseshoe.

15 Claims, 12 Drawing Figures

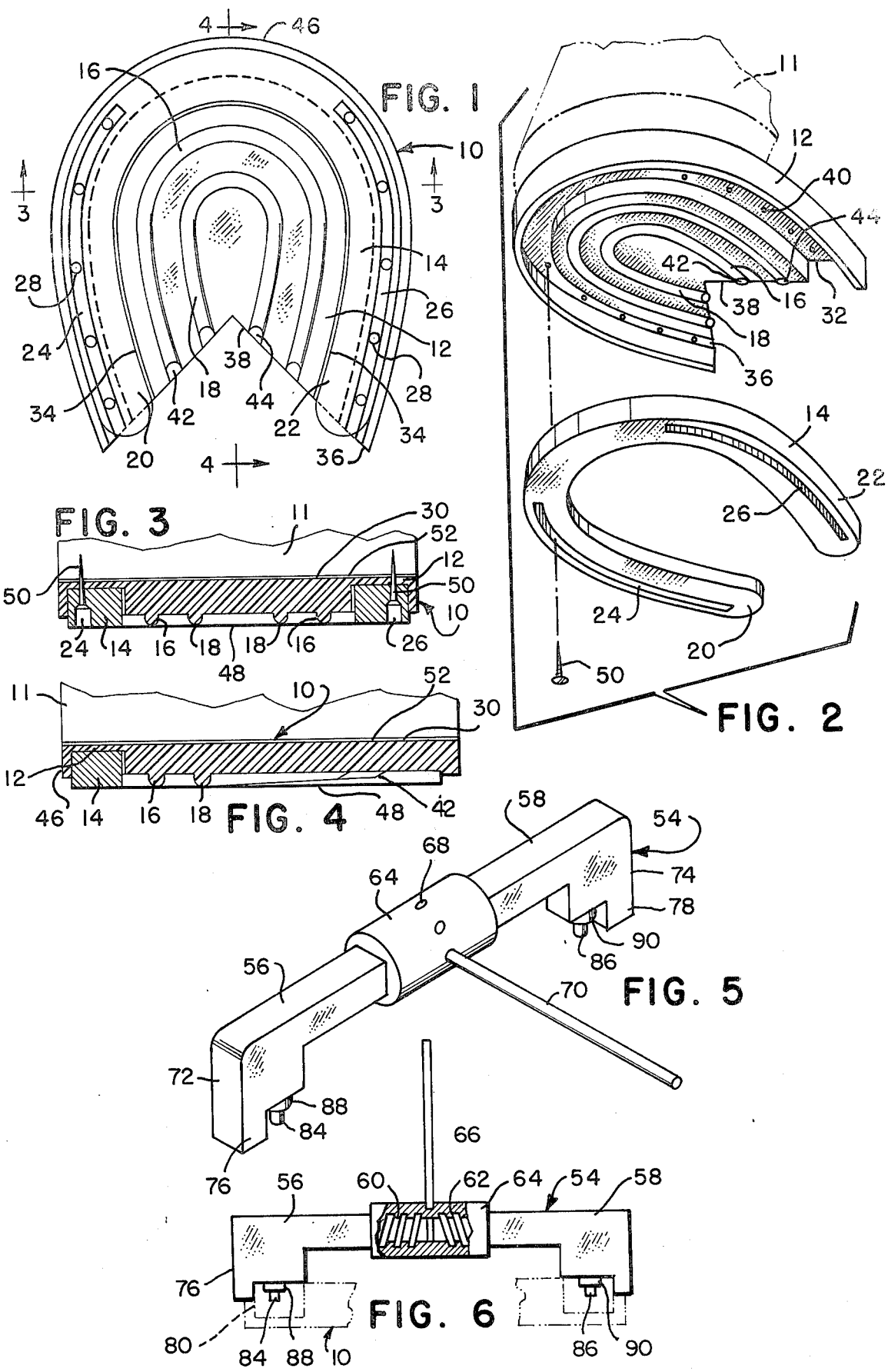

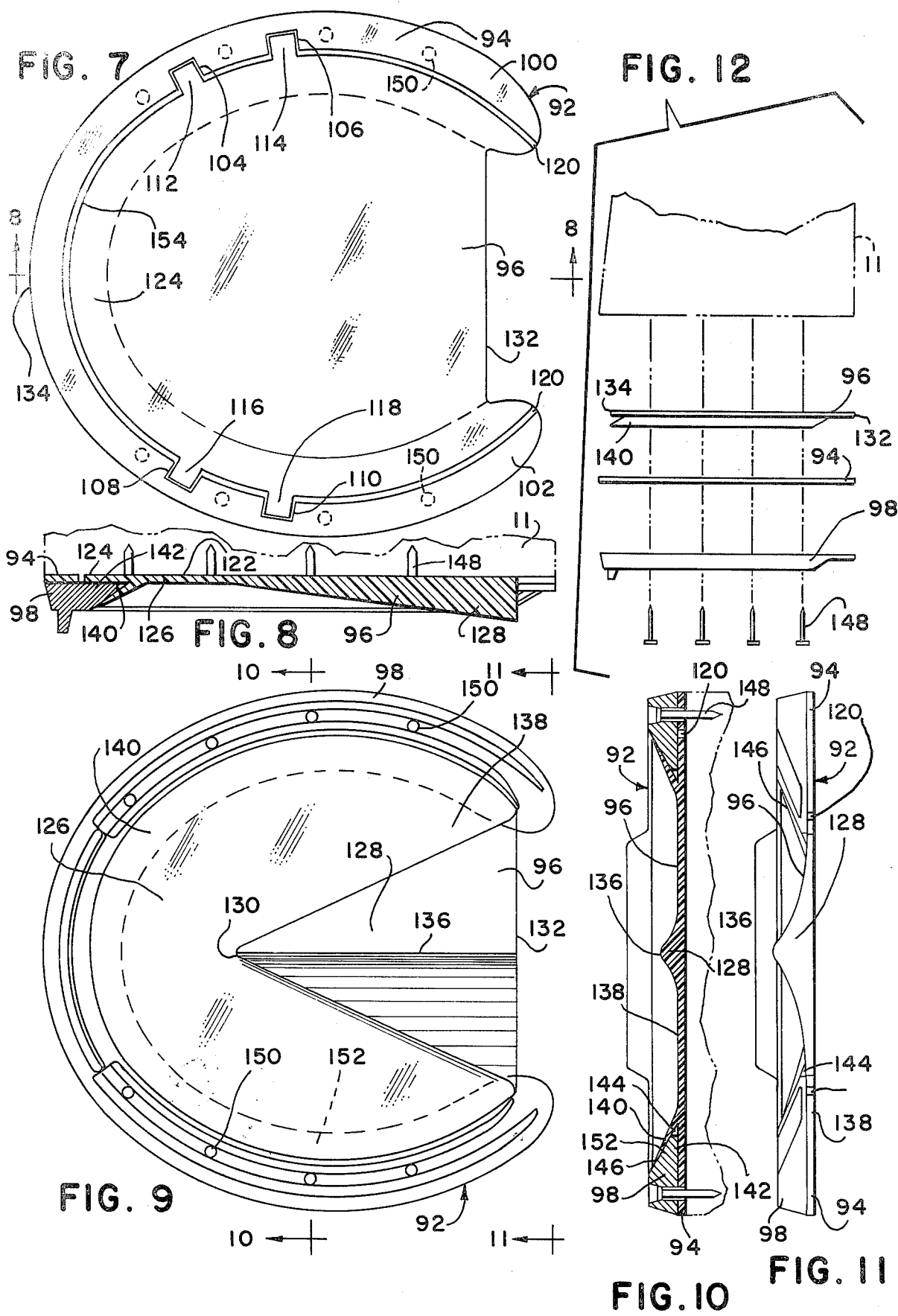

RACING TYPE HORSESHOE

BACKGROUND OF THE DISCLOSURE

The present invention relates generally to the field of horse shoes, and more particularly, to a racing type of horse shoe which is fabricated of a combination molded plastic sole plate to which is affixed an aluminum horse shoe.

Resilient, plastic horse shoes have been employed by prior workers in the art to provide greater flexibility, the damping of shocks which are caused by the repeated impacts of horse hoofs with relatively hard surfaces and the physical consequences thereof. The ankles, tendons and the knees of horses are frequently injured by such impacts, especially during periods of competition or during training periods for such competition. The soreness which can develop in horses' legs as a result of such impacts frequently becomes so severe that the legs must be packed in ice for substantial periods of time prior to the competition or else the horse will be unable to perform satisfactorily. In view of these difficulties, prior workers in the art have turned to resilient, molded plastic horse shoes in an attempt to find a solution to the problem. The plastic horse shoe disclosed in U.S. Pat. No. 3,490,536 is exemplary of this type of construction. While the prior art types of resilient horse shoes have resulted in certain improvements in the area of flexibility and in cushioning impact shocks, all of the prior art plastic horse shoes of which I am aware lack the strength and ruggedness of metallic shoes. Also, all prior art shoes are still affixed to the horse's hoofs by means of nails and accordingly the services of a blacksmith must be employed. The prior art type of plastic horse shoes do not incorporate imbedded metallic components which are necessary for optimum ground gripping during races and other competitive equestrian events.

SUMMARY OF THE INVENTION

The horse shoe of the present invention relates generally to the field of racing type horse shoes, and more particularly, is directed to a combination rigid aluminum shoe which is embedded within a resilient plastic sole plate wherein additional ground gripping cleats are integrally molded.

The present invention includes a molded synthetic plastic sole plate of suitable strength and resistance to abrasion to permit use as a racing type of horse shoe. An aluminum shoe is partially embedded in the plastic material and projects downwardly therefrom. The aluminum shoe is provided with right and left channels within which are positioned counter sunk holes to receive threaded fastening devices to thereby facilitate affixing the shoe to the horse's hoof without requiring the services of a blacksmith.

The plastic sole plate is provided with a pair of arcuate cleats which are integrally formed with the sole plate and which extend downwardly therefrom to enhance the ground gripping capabilities of the horse shoe. An arcuate space is provided between the inside edge of the aluminum shoe and the plastic material for resiliency and adjustment purposes and to allow slight relative movement of the composite structure when the horseshoe strikes the ground. A suitable wrench is employed to grip the aluminum shoe at the counter sunk holes thereof to laterally adjust the shoe to accommodate various sizes of horse's hoofs. The combination of the plastic sole plate, the embedded aluminum shoe and the molded cleats form a composite racing type horseshoe which provides sufficient resiliency, strength and damping of impact to more fully protect the horse's hoofs and legs during racing and other competitive events. The design provides more stability and a firmer grip for running on any type of track. By employing a shoe constructed in accordance with the present invention there is less chance of a horse developing lameness and all horses should be able to perform better and faster with less pain or with no pain at all due to foot problems.

In a modification of the present invention, a racing type horseshoe is provided which includes an outer, horseshoe shaped, resilient pad of approximately one-sixteenth of an inch in thickness. The outer pad is provided with a plurality of notches to receive tabs of a cooperating plastic frog pad in interlocking relation. The frog pad is fabricated of resilient material and includes an integral angular flange to receive a metallic horseshoe therein. The frog pad is molded to form an integral frog cleat of generally triangular configuration and additionally is provided with outwardly extending tabs to interlock with the notches of the outer pad. The modified horseshoe is affixed to the hoof by means of conventional nails which insert through the metallic horseshoe to thereby maintain the outer pad, the frog pad and the metallic shoe in position and securely affixed to the hoof.

It is therefore an object of the present invention to provide an improved racing type horseshoe of the type set forth.

It is another object of the present invention to provide a novel racing type horseshoe comprising in combination a plastic sole plate in which is embedded an aluminum horseshoe.

It is another object of the present invention to provide a novel racing type horseshoe which includes an aluminum horseshoe embedded within a plastic sole plate wherein the sole plate is molded or otherwise formed to provide a plurality of arcuate cleats for ground gripping purposes.

It is another object of the present invention to provide a novel racing type horse shoe including an aluminum horse shoe embedded within a plastic sole plate and wherein the horse shoe is provided with arcuate grooves which receive threaded fastening devices therein.

It is another object of the present invention to provide a novel racing type horse shoe comprising in combination an aluminum horse shoe which is embedded within a molded plastic sole plate and a width adjusting tool suitable to engage the metallic horse shoe for width adjusting purposes.

It is another object of the present invention to provide a novel combination metallic and plastic horse shoe which is provided with a plurality of countersunk holes suitable to permit the shoe to be affixed to a horse's hoof by threaded type fastening devices.

It is another object of the present invention to provide in combination a molded plastic sole plate within which is embedded an aluminum horse shoe, the top of the sole plate being provided with an adhesive layer to facilitate affixing the racing type horse shoe to the hoof of a horse during the shoeing procedures.

It is another object of the present invention to provide a novel racing type horse shoe that is inexpensive in manufacture, rugged in construction and trouble-free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 1 is a bottom plan view of a racing type horse shoe constructed in accordance with the present invention.

FIG. 2 is an exploded, perspective view of the horse shoe of FIG. 1.

FIG. 3 is a cross sectional view taken along Line 3—3 of FIG. 1, looking in the direction of the arrows.

FIG. 4 is a cross sectional view taken along Line 4—4 of FIG. 1, looking in the direction of the arrows.

FIG. 5 is a perspective view of a horse shoe width adjusting wrench.

FIG. 6 is an end elevational view of the wrench of FIG. 5, partly broken away to expose interior construction details and showing the racing type horse shoe in broken lines for purposes of association.

FIG. 7 is a top plan view of a modified racing type horseshoe construction.

FIG. 8 is a cross sectional view taken along Line 8—8 of FIG. 7, looking in the direction of the arrows.

FIG. 9 is a bottom plan view of the horseshoe of FIG. 7.

FIG. 10 is a cross sectional view taken along Line 10—10 of FIG. 9, looking in the direction of the arrows.

FIG. 11 is an end elevational view looking from Line 11—11 of FIG. 9.

FIG. 12 is an exploded, side elevational view of the horseshoe construction of FIGS. 7–11, illustrated in reduced scale.

DESCRIPTION OF THE PREFERRED EMBODIMENT OF THE INVENTION

Although specific terms are used in the following description for the sake of clarity, these terms are intended to refer only to the particular structure of my invention selected for illustration in the drawings, and are not intended to define or limit the scope of the invention.

Referring now to the drawings, I show in FIG. 1 a racing type horse shoe generally designated 10, which comprises a sole plate 12 of molded plastic material, preferably a hard, skid resistant type of plastic such as polyurethane plastic material. An aluminum horse shoe 14 is partially imbedded within the plastic sole plate 12 in a manner to partially project downwardly therefrom to thereby present a metallic surface for ground contacting purposes. Interiorly of the aluminum horse shoe 14, the sole plate is molded to form arcuate cleats 14, 16 for additional ground gripping purposes. The plastic sole plate is fabricated of material of suitable strength and resiliency to absorb the pressure of the horse's hoof as it strikes the ground while running. Molded polyurethane plastic or molded, high density polyvinylchloride plastic having suitable characteristics may be used for this purpose.

The same type of shoe would be equally applicable to both the front and rear hoofs of a horse. The cleats 14, 16 as designed may be employed in any type of racing track condition, such as sloppy, fast, muddy, heavy or on a grass course. Preferably, the aluminum shoe 14, is fabricated to cross sectional dimensions of three-quarters of an inch wide by one-half inch high and is formed to the usual horse shoe shape. Each open leg 20, 22 is provided with a downwardly open, arcuate channel 24, 26 which is preferably formed of rectangular configuration of dimensions ¼ inch deep and 3/16 inches wide. Spaced within the channels 24, 26 are a plurality of fastener receiving openings 28 which are preferably five in number within each of the channels 24, 26. I prefer to fabricate each opening 28 of ⅛ inch diameter and countersunk to receive threaded fasteners as hereinafter fully set forth.

The sole plate 12 is molded to provide a solid roof 30 for affixing to the horse's hoof (not shown) and for protection of the hoof during racing. The sole plate 12 is molded to provide an arcuate channel 32 which receives therein the metallic horse shoe 14. The channel 32 is fabricated of suitable dimensions to receive the horse shoe 14 therein in a manner to provide a small overall arcuate clearance space 34 which preferably is in the range of approximately one-thirty secondth of an inch. The provision for the clearance space 34 allows slight movement or give between the plastic sole plate 12 and the aluminum horse shoe 14 when the horse shoe 10 strikes the ground, to thereby help absorb some of the shock. As is seen in FIG. 1, the leading edge 36 of the sole plate 12 is formed to a generally V-shaped configuration 38 to accommodate the frog (not shown) of the horse's hoof. If desired, the arcuate channel 32 of the sole plate 12 may be provided with a plurality of openings 40 which align with the fastener receiving openings 28 of the aluminum horse shoe 14 to facilitate horse shoe attaching procedures. As illustrated in FIGS. 3 and 4, each of the arcuate cleats 16, 18 is formed to a diameter of approximately three-sixteenths of an inch and is provided with a chamfered leading edge 42, 44. Both cleats 16, 18 slope slightly from the leading edge 36 of the horse shoe to the trailing edge 46 of the horse shoe and extend downwardly from the roof 30 of the sole plate 12 a sufficient distance to lie in the same plane as the bottom surface 48 of the aluminum horse shoe 14.

Preferably, an adhesive pad 52 is provided over the sole plate roof 30 in a manner to facilitate applying the racing type horse shoe 10 to the horse's hoof (not shown). Any conventional type adhesive having adequate qualities to adhere both to plastic and to the bony structure of the horse's hoof would be suitable for the purpose. Also, a double adhesive surface tape of known design could also be employed for this purpose with equal facility. A plurality of threaded fasteners such as self-tapping type, Phillips head screws are inserted through the aligned openings 28, 40, which are respectively provided in the aluminum horse shoe 14 and the sole plate 12, and the fasteners are then turned directly into the horse's hoof (not shown) by employing conventional tools, thereby eliminating the former procedures which are usually performed only by a blacksmith.

In order to permit the racing type horse shoe 10 of the present invention to be applied by means of the threaded fasteners 50 without employing the services of a blacksmith, a wrench action adjusting tool 54 has been designed for use with the racing type horse shoe 10. The tool comprises a pair of aligned, opposed arms 56, 58 which terminate inwardly in threaded ends 60, 62 about which a barrel type adjusting socket 64 can be turned for width adjustment. The socket 64 is provided with cooperating interior threads 66 which threadedly engage the threaded ends 60, 62 of the arms 56, 58 to move the arms either further apart or closer together as desired. The socket 64 is provided with a plurality of peripherally spaced holes 68 which receive therein a wrench handle 70 of sufficient length to provide adequate leverage to turn the adjusting socket 64 for horse shoe width adjusting purposes. Thus, by placing one end of the wrench handle 70 within a peripheral hole 68, the socket 64 may be urged in either a clockwise or counterclockwise direction, depending on whether it is desired to move the respective arms 56, 58 either closer together or further apart. The natural resiliency of metallic aluminum permits the desired minimum size adjustment without fracture or other material weakening condition. The arms 56, 58 terminate outwardly in respective jaw ends 72, 74 which are designed to vary the spacing between the open legs 20, 22 of the aluminum horse shoe 14 without the need for heat treating, hammering or other operations usually performed by a blacksmith.

Each of the jaw ends 72, 74 is provided with a strong depending flange 76, 78, each of which is employed to engage a respective outer arcuate surface 80, 82 of one of the open legs 20, 22 of the aluminum horse shoe 14. By turning the adjusting socket 64 in one direction, for example, clockwise, using the wrench handle 70 successively in peripherally offset holes 68, the adjusting tool 54 can then be employed to pull the open legs 20, 22 toward each other for horse shoe fitting purposes. It is contemplated that a travel of approximately one-quarter of an inch between the jaw ends 72, 74 will prove sufficient for this purpose. In order to spread the legs 20, 22 of the aluminum horse shoe 14 for fitting purposes, each end 72, 74 of the adjusting tool 54 is provided with a pin 84, 86 of diameter to fit snugly within one of the fastener receiving openings 28 of the aluminum horse shoe 14. Accordingly, if the openings 28 are drilled to a three-sixteenth inch diameter size, for example, the respective pins 84, 86 should be fabricated slightly smaller to thereby provide a snug fit within the respective holes 28. As seen in FIG. 6, the pins 84, 86 mount upon respective platforms 88, 90 for horseshoe size adjustment purposes. The platforms 88, 90 are fabricated approximately ¼ inch square by ¼ inch deep to snugly fit within the respective arcuate channels 24, 26 which are provided in the aluminum horse shoe 14. Thus, in order to spread the legs 20, 22 by means of the adjusting tool 54, the adjusting socket 64 is turned until the distance between the pins 84, 86 is just sufficient to position within opposed openings 28 which are provided in the aluminum horse shoe. In this position, the respective pin platforms 88, 90 will seat securely within the respective arcuate channels 24, 26 to thereby provide an extremely strong and secure mounting for the tool 54 when it is desired to push the legs 20, 22 apart. Then, by turning the adjusting socket 64 by using the wrench handle 70 in a predetermined direction, for example, counterclockwise, the jaw ends 72, 74 can be pushed apart a desired distance to fit the hoof of a horse, for example, through an adjusting distance of approximately one-quarter of an inch.

In order to use the racing type horse shoe of the present invention, a combined plastic and embedded aluminum horse shoe is first fabricated in accordance with the description hereinbefore set forth and then the shoe is measured against the hoof (not shown) of a horse. The legs 20, 22 are then either pushed apart or pulled together by employing the adjusting tool 54 as necessary to insure a proper fit. As hereinbefore set forth, in order to pull the legs 20, 22 together, the tool end flanges 76, 78 are brought into contact with the outer surfaces 80, 82 of the aluminum horse shoe 14 and then the adjusting socket 64 is turned by means of the wrench handle 70 until the exact desired opening between the legs 20, 22 is achieved. Similarly, if it is desired to spread the legs 20, 22, the adjusting tool 54 is again employed by inserting the pins 84, 86 within opposed fastener receiving openings 28 and the platforms 88, 90 are seated within the respective right and left arcuate channels 24, 26. With the tool properly seated, the adjusting socket 64 is again turned by means of the wrench handle 70 in a direction to push the jaw ends 72, 74 apart a sufficient distance to insure a proper fit. After adjusting the size of the horseshoe, the racing type horseshoe 10 is temporarily applied to the horse's hoof (not shown) by employing an adhesive pad or layer 52. Then, a plurality of threaded fasteners such as self-tapping screws with Phillips heads are then turned into the aluminum horseshoe openings 28, through the plastic sole plate openings 40 and into the horse's hoof. Preferably, five similar threaded fasteners 50 are employed in conjunction with each of the left and right legs 20, 22 of the aluminum horseshoe to assure adequate connection strength.

Referring now to FIGS. 7 – 12, I show a modified racing type horseshoe 92, which includes generally an outer, horseshoe-shaped, plastic pad 94, an inner plastic frog pad 96, which interlocks with the outer pad 94 and a conventional aluminum horseshoe 98. preferably, the outer pad 94 and the plastic frog pad 96 are fabricated of the same material which may be a soft, flexible, readily moldable plastic material such as polyethylene plastic or polyurethane plastic. The material should be resilient to absorb the shocks attendant with hoofs striking the ground. The aluminum horseshoe 98 is conventional and well known in the art. Horseshoes as manufactured by Victory Racing Plate Co., Baltimore, Maryland have been found suitable for this purpose.

The outer pad 94 is fabricated generally to conform to the outer peripheral outline of the horseshoe 98 and extends inwardly a distance equal to approximately one-half the lateral width of the horseshoe. Each leg 100, 102 of the outer pad 94 is provided with a paid of spaced notches 104, 106 and 108, 110 which receive therein the cooperating tabs 112, 114 and 116, 118 which are integrally formed in the frog pad 96. Upon use, the outer pad 94 is applied against the horse's hoof 11 immediately above the horseshoe 98 to define a clearance space 120 equal to height of the pad 94. Preferably, the pad 94 is fabricated to a thickness of approximately one-sixteenth of an inch to provide sufficient resiliency and clearance for the modified horseshoe construction 92.

The frog pad 96 is fabricated with a flat top surface 122 for contacting the hoof 11 and terminates outwardly in a flat peripheral ledge 124 for pad attaching purposes. The peripheral ledge 124 is molded or otherwise formed to integrally carry the peripherally extending attaching tabs 112, 114, 116, 118. Upon installation, the peripheral ledge 124 inserts above the horseshoe 92 and is positioned within the clearance space 120 which is defined between the hoof 11 and the aluminum horseshoe 98 as spaced by the outer pad 94. As hereinbefore set forth, the respective tabs 112, 114 insert within the notches 104, 106 and the tabs 116, 118 insert within the notches 108, 110 to provide a resilient and secure connection between the frog pad 96 and the outer pad 94. The frog pad 96 is formed with a relatively flat heel portion 126 and a forwardly positioned, relatively triangular-shaped frog cleat 128. The frog cleat 128 has its apex 130 axially aligned and positioned within the heel portion 26 approximately two-thirds of the distance from the leading edge 132 to the trailing edge 134 of the frog pad 96. The frog cleat 128 is symmetrically formed and has an axially aligned central ridge 136 which rises uniformly from the apex 130, which is flush with the bottom of the heel portion 126, to the leading edge 132 wherein the cleat 128 is preferably five-sixteenths of an inch in thickness. The cleat 128 slopes gradually laterally outwardly from the central ridge 136 toward the peripheral edge 138 of the frog pad 96. The peripheral edge portion 138 is fabricated approximately one-sixteenth of an inch in thickness to uniformly join with the heel portion 126.

An angular, peripheral flange 140 is integrally formed with the peripheral edge 138 and the heel portion 126 of the frog pad 96 to form an angular, peripheral recess 142 to receive the interior peripheral portions of the horseshoe 98 therein. Preferably, a clearance space of approximately one-sixteenth of an inch is provided between the base of the flange 140 and the horseshoe 98 for size adjustment purposes. The flange 140 feathers outwardly from a thickness of approximately one-sixteenth of an inch at the peripheral edge 138 to zero thickness at the outer edge 146 to receive the horseshoe 98 therein in a smooth connection so as not to interfere with the racing ability of the horseshoe itself.

Upon use, the horseshoe 98 is conventionally affixed to the hoof 11 by means of a plurality of nails 148 which are driven through the openings 150 which are conventionally provided in the horseshoe 98 for this purpose. The outer pad 94 is interposed between the top of the horseshoe 98 and the bottom of the hoof 11 to define an inwardly open clearance space 120 between the bottom of the hoof 11 and the top of the horseshoe 98. With the horseshoe 98 thus firmly secured by means of the nails 148, the peripheral ledge 126 of the plastic frog pad 96 is urged into the clearance space 120 by employing the natural flexibility of the frog pad material itself. When the peripheral ledge 124 is fully seated within the clearance space 120, the tabs 112, 114 position within the notches 104, 106 and the tabs 116, 118 insert within the notches 108, 110 to provide a secure construction, which although resilient in nature, is so fabricated as to prevent the plastic frog pad 96 from working free of the horseshoe 98. The angular flange 140 of the frog pad 96 extends over the bottom peripheral edge 152 of the horseshoe 98 in a manner to sandwich the horseshoe between the peripheral edge 138 and the angular flange. The combination of the interlocking notches and tabs, the insertion of the peripheral ledge 126 into the clearance space 120 and the sandwiching of the horseshoe between the bottom of the peripheral edge 138 and the angular flange 140 all cooperate to provide a secure, resilient connection between the frog pad 96 and the horseshoe 98 to prevent disassociation of the parts at all times, even under the extreme conditions imposed during the racing. Preferably, a peripheral clearance space 154 (FIG. 7) is provided between the outer pad 94 and the outer periphery of the frog pad 96 to provide additional resiliency and to permit a degree of size adjustment to thus accommodate the variances in sizes among hoofs.

Although I have described the present invention with reference to the particular embodiments therein set forth, it is understood that the present disclosure has been made only by way of example and that numerous changes in the details of the construction may be resorted to without departing from the spirit and scope of the invention. Thus, the scope of the invention should not be limited by the foregoing specification, but rather only by the scope of the claims appended hereto.

I claim:
1. In a racing type horseshoe including a metallic horseshoe for affixing to a hoof, the combination of
    A. an outer, horseshoe shaped pad in contact with the hoof,
        1 said outer pad being defined within an outer peripheral edge and an inner peripheral edge,
            a. said inner peripheral edge overlying a portion of the horseshoe,
            b. said pad defining an inwardly open clearance space between the hoof, the horseshoe and the said inner peripheral edge; and
    B. a frog pad in contact with the hoof and having a top surface
        1 said frog pad terminating outwardly in a peripheral ledge, said ledge positioning within the clearance space defined within the inner peripheral edge of the outer pad to enable the frog pad to be removed from the hoof without removing the horseshoe,
        2. said frog pad including means to engage the horseshoe to removably retain the frog pad in engagement with the horseshoe.

2. The racing type horseshoe of claim 1 and means to interlock the outer pad and the frog pad.

3. The racing type horseshoe of claim 2 wherein the means to interlock include at least one notch formed in one pad and at least one tab formed in the other, the said tab removably inserting into the said notch.

4. The racing type horseshoe of claim 3 wherein the notch is formed in the outer pad and the tab is formed in the frog pad.

5. The racing type horseshoe of claim 1 wherein the means to engage includes an integral flange and a peripheral ledge formed in the frog pad, the said ledge and said flange defining a horseshoe receiving area therebetween.

6. The racing type horseshoe of claim 5 wherein the flange is angularly positioned relative to the ledge.

7. The racing type horseshoe of claim 6 wherein the angular position of the flange from the ledge is less than ninety degrees.

8. The racing type horseshoe of claim 5 wherein the ledge and the flange join in an angular junction and wherein a clearance space is defined between the horseshoe and the junction.

9. The racing type horseshoe of claim 1 wherein a second clearance space is defined between the inner peripheral edge of the outer pad and the frog pad.

10. The racing type horseshoe of claim 1 and a frog cleat formed in the frog pad, said frog cleat depending downwardly from the said top surface.

11. The racing type horseshoe of claim 10 wherein the frog cleat is triangularly shaped in cross sectional configuration.

12. The racing type horseshoe of claim 11 wherein the frog cleat is triangularly shaped in plan.

13. The racing type horseshoe of claim 12 wherein the frog pad includes a relatively flat heel portion, said heel portion beginning at the rearward terminus of the frog cleat.

14. The racing type horseshoe of claim 11 wherein the frog cleat is symmetrically formed and includes an arially aligned central ridge.

15. The racing type horseshoe of claim 14 wherein the central ridge rises uniformly from an apex which is flush with the said heel portion.

* * * * *